United States Patent
Toy

(10) Patent No.: US 11,598,344 B2
(45) Date of Patent: Mar. 7, 2023

(54) AUTOMATIC CONTROL SYSTEM FOR CEILING FAN BASED ON TEMPERATURE DIFFERENTIALS

(71) Applicant: DELTA T, LLC, Lexington, KY (US)

(72) Inventor: Mark A. Toy, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 414 days.

(21) Appl. No.: 16/429,558

(22) Filed: Jun. 3, 2019

(65) Prior Publication Data
US 2019/0285078 A1  Sep. 19, 2019

Related U.S. Application Data

(63) Continuation of application No. 14/556,575, filed on Dec. 1, 2014, now abandoned, which is a continuation
(Continued)

(51) Int. Cl.
*F04D 27/00* (2006.01)
*F24F 11/77* (2018.01)
(Continued)

(52) U.S. Cl.
CPC ......... *F04D 27/004* (2013.01); *F04D 19/002* (2013.01); *F04D 25/088* (2013.01);
(Continued)

(58) Field of Classification Search
CPC .. F24F 11/77; F24F 7/007; F24F 11/30; F24F 2110/10; F24F 2110/20; F24D 19/002;
(Continued)

(56) References Cited

U.S. PATENT DOCUMENTS 4,797,600 A    1/1989  Savage et al.
4,891,953 A    1/1990  Isono
(Continued)

FOREIGN PATENT DOCUMENTS

CA    2668900 A1    5/2008
CN    2570505 Y     9/2003
(Continued)

OTHER PUBLICATIONS

English Machine Translation of JP2005030692A dated Feb. 3, 2005.
(Continued)

*Primary Examiner* — Avinash A Savani
*Assistant Examiner* — Dana K Tighe
(74) *Attorney, Agent, or Firm* — Dickinson Wright PLLC; Andrew D. Dorisio

(57) ABSTRACT

A fan includes a hub, several fan blades, and a motor that is operable to drive the hub. A motor controller is in communication with the motor, and is configured to select the rate of rotation at which the motor drives the hub. The fan is installed in a place having a floor and a ceiling. An upper temperature sensor is positioned near the ceiling. A lower temperature sensor is positioned near the floor. The temperature sensors communicate with the motor controller, which includes a processor configured to compare substantially contemporaneous temperature readings from the upper and lower temperature sensors. The motor controller is thus configured to automatically control the fan motor to minimize the differences between substantially contemporaneous temperature readings from the upper and lower temperature sensors. The fan system may thus substantially destratify air in an environment, to provide a substantially uniform temperature distribution within the environment.

18 Claims, 2 Drawing Sheets

Related U.S. Application Data of application No. 12/844,940, filed on Jul. 28, 2010, now Pat. No. 8,900,041, which is a continuation of application No. PCT/US2009/032935, filed on Feb. 3, 2009.

(60) Provisional application No. 61/025,852, filed on Feb. 4, 2008.

(51) Int. Cl.
| F04D 25/08 | (2006.01) |
| F24F 7/007 | (2006.01) |
| F24F 11/63 | (2018.01) |
| F24F 11/76 | (2018.01) |
| F04D 27/02 | (2006.01) |
| F04D 19/00 | (2006.01) |
| F24F 110/20 | (2018.01) |
| F24F 11/30 | (2018.01) |
| F24F 110/10 | (2018.01) |
| F24F 11/56 | (2018.01) |

(52) U.S. Cl.
CPC ........... *F04D 27/00* (2013.01); *F04D 27/001* (2013.01); *F04D 27/02* (2013.01); *F24F 7/007* (2013.01); *F24F 11/63* (2018.01); *F24F 11/76* (2018.01); *F24F 11/77* (2018.01); *F24F 11/30* (2018.01); *F24F 11/56* (2018.01); *F24F 2110/10* (2018.01); *F24F 2110/20* (2018.01); *Y02B 30/70* (2013.01); *Y10T 29/49316* (2015.01)

(58) Field of Classification Search
CPC ...... F24D 25/088; F24D 27/00; F24D 27/001; F24D 27/02; F04D 27/004; F04D 19/002; F04D 25/088; F04D 27/00; F04D 27/001; F04D 27/02
USPC ......................................................... 454/258
See application file for complete search history.

(56) References Cited

U.S. PATENT DOCUMENTS

| 4,926,839 | A | | 5/1990 | Sugawara et al. |
| 5,232,152 | A | | 8/1993 | Tsang |
| 5,316,214 | A | | 5/1994 | Suzuki et al. |
| 5,477,698 | A | * | 12/1995 | Takegawa ............ F24F 11/0009 236/78 B |
| 5,592,058 | A | | 1/1997 | Archer et al. |
| 5,627,527 | A | * | 5/1997 | Mehta ................... F04D 25/088 340/3.1 |
| 6,415,984 | B1 | | 7/2002 | Parker et al. |
| 6,589,016 | B2 | | 7/2003 | Boyd et al. |
| 6,772,604 | B2 | | 8/2004 | Bash et al. |
| 6,843,063 | B2 | | 1/2005 | Miwa |
| 7,138,781 | B2 | | 11/2006 | Murray et al. |
| 7,953,520 | B2 | | 5/2011 | Hayashi |
| 2005/0252983 | A1 | * | 11/2005 | Acker ..................... F24F 11/30 236/44 R |
| 2005/0277381 | A1 | | 12/2005 | Banerjee et al. |
| 2006/0099904 | A1 | | 5/2006 | Belt et al. |
| 2007/0084938 | A1 | | 4/2007 | Liu |
| 2007/0171613 | A1 | * | 7/2007 | McMahan .......... H05K 7/20736 361/695 |
| 2008/0288124 | A1 | * | 11/2008 | Huang .................... G06F 1/206 700/300 |
| 2009/0014545 | A1 | * | 1/2009 | Horiuchi .................. F24F 11/30 236/49.3 |
| 2009/0076658 | A1 | | 3/2009 | Kinnis |

FOREIGN PATENT DOCUMENTS

| JP | H0642780 A | 2/1994 |
| JP | H0827099 A | 1/1996 |
| JP | H08231136 A | 9/1996 |
| JP | H1183103 A | 3/1999 |
| JP | 2510333 Y2 | 5/2004 |
| JP | 5175643 B2 | 5/2004 |
| JP | 2004150679 A | 5/2004 |
| JP | 2005030692 A | 2/2005 |
| KR | 100627402 B1 | 3/1999 |

OTHER PUBLICATIONS

English Machine Translation of JPH08231136A dated Sep. 10, 1996.
English Machine Translation of JPH0642780A dated Feb. 18, 1994.
Son H. Ho, Luis Rosario and Muhammad M. Rahman, Effects of Using Ceiling Fan on Human Thermal Comfort in Air-Conditioned Space, 3rd International Energy Conversion Engineering Conference, Aug. 15-18, 2005, pp. 1-11, American Institute of Aeronautics and Astronautics.
C.A. Flood Jr., J.L. Koon, R D. Trumbull, R.N. Brewer, Energy Savings with Ceiling Fans in Broiler Houses, Applied Engineering in Agriculture, 1998, pp. 305-309, vol. 14(3): 305-309.
J. Carey Smith, Consider Ceiling Fans for Winter Duty, www.impomag.com, Dec. 1999, p. 1 of 1.
Richard Aynsley, Environment Design Guide—Circulating Fans for Summer and Winter Comfort and Indoor Energy Efficiency—Summary of Actions Towards Sustainable Outcomes, Australian Institute of Architects, Nov. 2007 TEC 25, pp. 1-1.
Energy User News; Case Studies; "Distribution Center Stays Cool without AC"; Dec. 1999.
John Degaspari; "A Fan for all seasons"; Mechanical Engineering; Dec. 1999.
Ted Gribble; Dairyman.com; "Dairy Cow Cooling"; 2007; Issue No. 1.
Penton Media, Inc.; "Livestock"; Farm Industry News; vol. 32, Issue 10; 1999.
Henley; "Get Cool by Going Big"; Club Solutions Magazine; 2007.
Big Ass Fan Co.; Plant Engineering; "HVLS ceiling fan"; 2007.
"Patented fan blade design helps keep Toyota cool"; The Fabricator; 2007.
Broan; Humidity Sensing Fan; Model QTXE110S; Parts Manual; Wisconsin.
EE Times; Closed Loop Fan Control at the System Level; Darrin Vallin; Cypress Semiconductor Corp; 2006.

\* cited by examiner

AUTOMATIC CONTROL SYSTEM FOR CEILING FAN BASED ON TEMPERATURE DIFFERENTIALS

PRIORITY

This application is a continuation of U.S. patent application Ser. No. 14/556,575, filed on Dec. 1, 2014, entitled "Automatic Control System for Ceiling Fan Based on Temperature Differentials," the disclosure of which is incorporated herein by reference and which is a continuation of U.S. patent application Ser. No. 12/844,940, filed Jul. 28, 2010, now U.S. Pat. No. 8,900,041, issued Dec. 2, 2014, entitled "Automatic Control System for Ceiling Fan Based on Temperature Differentials," the disclosure of which is incorporated herein by reference and which is a continuation of International Patent Application Serial No. PCT/US2009/032935, entitled "Automatic Control System for Ceiling Fan Based on Temperature Differentials," filed Feb. 3, 2009, published as WO 2009/100052 on Aug. 13, 2009, the disclosure of which is incorporated by reference herein in its entirety, and which claims priority from the disclosure of U.S. Provisional Patent Application Ser. No. 61/025,852, entitled "Automatic Control System for Ceiling Fan Based on Temperature Differentials," filed Feb. 4, 2008, the disclosure of which is incorporated by reference herein in its entirety.

BACKGROUND

A variety of fan systems have been made and used over the years in a variety of contexts. For instance, various ceiling fans are disclosed in U.S. Pat. No. 7,284,960, entitled "Fan Blades," issued Oct. 23, 2007, the disclosure of which is incorporated by reference herein; U.S. Pat. No. 6,244,821, entitled "Low Speed Cooling Fan," issued Jun. 12, 2001, the disclosure of which is incorporated by reference herein; U.S. Pat. No. 6,939,108, entitled "Cooling Fan with Reinforced Blade," issued Sep. 6, 2005, the disclosure of which is incorporated by reference herein; U.S. Pub. No. 2008/0008596, entitled "Fan Blades," published Jan. 10, 2008, the disclosure of which is incorporated by reference herein; and U.S. Provisional Patent Application Ser. No. 61/034,254, entitled "Ceiling Fan System with Brushless Motor," filed Mar. 6, 2008, the disclosure of which is incorporated by reference herein. Alternatively, any other suitable fans may be used in conjunction with embodiments described herein.

The outer tip of a fan blade or airfoil may be finished by the addition of an aerodynamic tip or winglet. Merely exemplary winglets are described in U.S. Pat. No. 7,252,478, entitled "Fan Blade Modifications," issued Aug. 7, 2007, the disclosure of which is incorporated by reference herein; U.S. Pub. No. 2008/0014090, entitled "Cuffed Fan Blade Modifications," published Jan. 17, 2008, the disclosure of which is incorporated by reference herein; and U.S. Pub. No. 2008/0213097, entitled "Angled Airfoil Extension for Fan Blade," published Sep. 4, 2008, the disclosure of which is incorporated by reference herein. Other suitable structures that may be associated with an outer tip of an airfoil or fan blade will be apparent to those of ordinary skill in the art in view of the teachings herein. Alternatively, the outer tip of an airfoil or fan blade may be simply closed, or may lack any similar structure at all.

The interface of a fan blade and a fan hub may also be provided in a variety of ways. For instance, an interface component is described in U.S. Non-Provisional patent application Ser. No. 12/233,783, entitled "Aerodynamic Interface Component for Fan Blade," filed Sep. 19, 2008, the disclosure of which is incorporated by reference herein. Alternatively, the interface of a fan blade and a fan hub may include any other component or components, or may lack any similar structure at all.

Fans may also include a variety of mounting structures. For instance, a fan mounting structure is disclosed in U.S. Non-Provisional patent application Ser. No. 12/203,960, entitled "Ceiling Fan with Angled Mounting," filed Sep. 4, 2008, the disclosure of which is incorporated by reference herein. In addition, a fan may include sensors or other features that are used to control, at least in part, operation of a fan system. For instance, such fan systems are disclosed in U.S. Non-Provisional patent application Ser. No. 12/249,086, entitled "Ceiling Fan with Concentric Stationary Tube and Power-Down Features," filed Oct. 10, 2008, the disclosure of which is incorporated by reference herein; and U.S. Non-Provisional patent application Ser. No. 12/336,090, entitled "Automatic Control System and Method to Minimize Oscillation in Ceiling Fans," filed Dec. 16, 2008, the disclosure of which is incorporated by reference herein. Alternatively, any other suitable mounting structures and/or fan systems may be used in conjunction with embodiments described herein.

The effectiveness of very large, High Volume/Low Speed ("HVLS") ceiling fans as a component of a climate control system in buildings may be readily observed, such as in warm weather when the fans are either used alone or in conjunction with air conditioning, and in winter when they are used in conjunction with a heating system. In the absence of such fans in some settings, natural convection may cause the air to stratify, with the warmest layers at the top adjacent to the roof and the coolest layers at the floor. This may be a particularly undesirable condition in winter, when occupants at floor level may desire heat, and high temperatures just below the roof may increase the rate of thermal loss through the roof and decrease energy efficiency.

A primary function of an HVLS fan in such an environment, particularly in winter months when the HVLS fan is used in conjunction with a heating system, may be to maintain a substantially uniform air temperature throughout the enclosed space by blending the heated air from the upper part of the space with the cooler air closer to the floor. A comfortable and energy-efficient condition may be maintained when the speed of the fan is controlled so that there is just enough air movement to maintain uniform air temperature without excessive speed that might create undesirable drafts. In practice, this condition may be only approximated in many situations. For instance, the speed of the fan may be controlled either manually (e.g., by a control operated by a person at floor level, etc.), or automatically (e.g., by coupling the fan to the controls of the heating system, etc.). In manual operation, the fan may be controlled on the basis of the operator's subjective sense of comfort; and in heating-coupled automatic operation, it may be responsive to room temperature. However, such bases of control may not necessarily provide a substantially uniform temperature throughout the space.

While a variety of systems and techniques have been made and used to control fans and fan systems, it is believed that no one prior to the inventor has made or used the invention recited in the appended claims.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Reference will now be made in detail to various embodiments of the invention, examples of which are illustrated in the accompanying drawings. To the extent that specific dimensions are shown in the accompanying drawings, such dimensions should be regarded as merely illustrative and not limiting in any way. Accordingly, it will be appreciated that such dimensions may be varied in any suitable way.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 1:
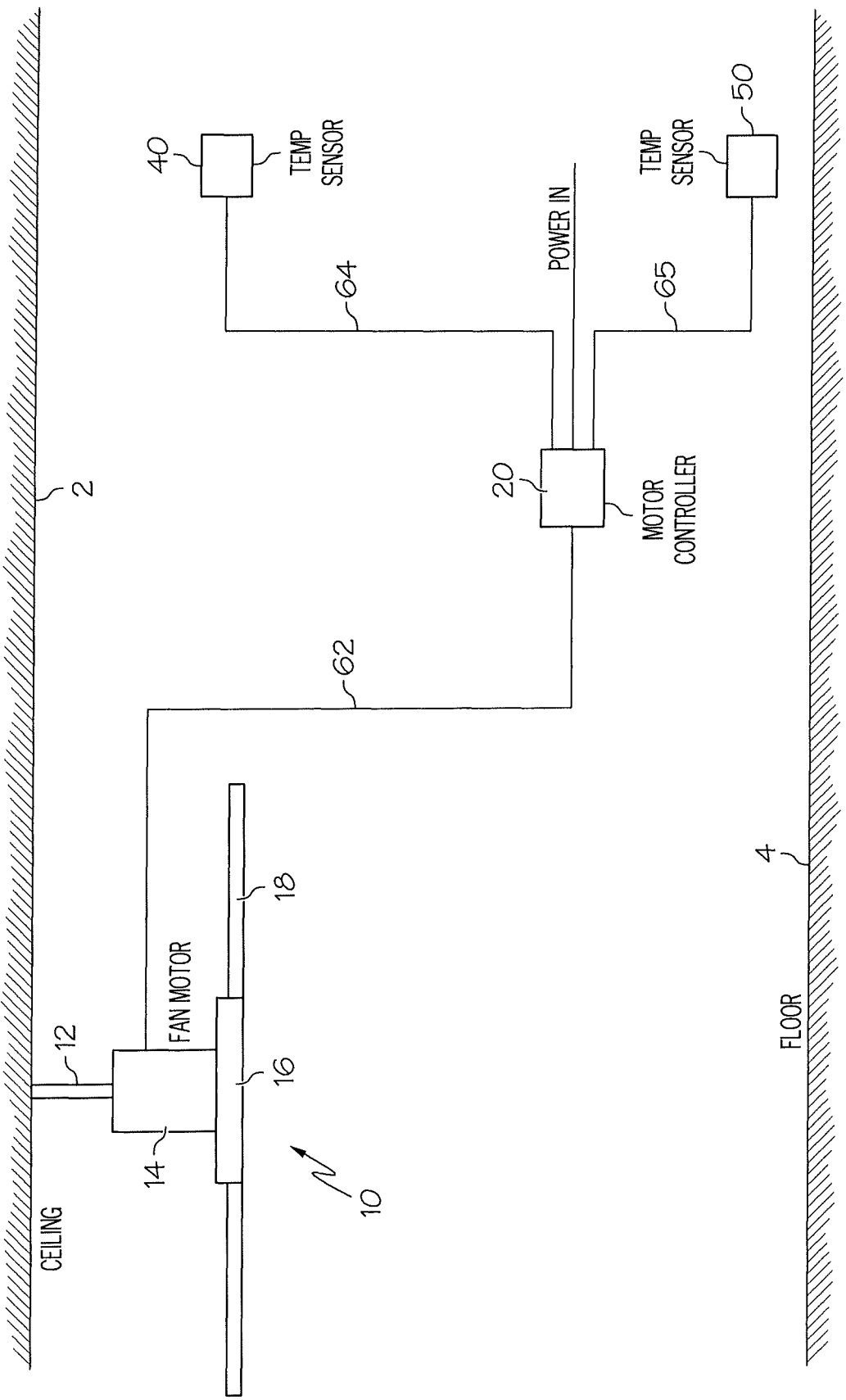
FIG. 1 depicts a schematic view of an exemplary fan system including control components.

As shown in FIG. 1, an exemplary fan (10) is coupled with a ceiling structure (2), and is suspended over a floor (4). Fan (10) includes a support (12), which is directly coupled with ceiling structure (2). Support (12) may be constructed and/or operable in accordance with the teachings of any of the patents, patent publications, or patent applications cited herein. Fan (10) also includes a motor (14), a hub (16) that is rotated by motor (14), and a plurality of fan blades (18) extending radially outwardly from hub (16). Again, any of these components, among other components that fan (10) may have as desired, may be constructed and/or operable in accordance with the teachings of any of the patents, patent publications, or patent applications cited herein.

A motor controller (20) is in communication with motor (14). For instance, motor controller (20) may include a programmable variable speed control (24), providing a spectrum of speeds at which hub (16) may be rotated by motor (14). Suitable components and features of motor controller (20) will be apparent to those of ordinary skill in the art in view of the teachings herein. Motor controller (20) may communicate with motor (14) via wire (62), wirelessly, or in any other suitable fashion. A user interface (not shown) may also be in communication with motor controller (20), permitting an operator to adjust speed settings (e.g., select from discrete pre-defined speeds or select a speed from a substantially continuous range of speeds, etc.) for motor (14) through motor controller (20). By way of example only, a suitable user interface may comprise a wall-mounted control panel that is configured and operable in accordance with the teachings of U.S. Provisional Patent Application Ser. No. 61/034,254, entitled "Ceiling Fan System with Brushless Motor," filed Mar. 6, 2008, the disclosure of which is incorporated by reference herein. Alternatively, any other suitable user interface may be used. In the present example, the user interface communicates with motor controller (20) via a wire (not shown). However, it should be understood that a user interface may alternatively communicate with motor controller (20) wirelessly or in any other suitable fashion.

It should also be understood that motor controller (20) and a user interface may be provided in any suitable location. By way of example only, motor controller (20) may be located within or adjacent to motor (14). Alternatively, motor controller (20) may be located within or adjacent to a user interface, or somewhere else between a user interface and motor (14). Alternatively, motor controller (20) may be provided at any other suitable location. Similarly, a user interface may be mounted to a wall, may be provided by a computer that is far remote from the location in which fan (10) is installed, or may be provided at any other suitable location.

As also shown in FIG. 1, the system of the present example further comprises two temperature sensors (40, 50) that are in communication with motor controller (20). Sensors (40, 50) may communicate with motor controller (20) via wires (64, 65), wirelessly, or in any other suitable fashion. Sensors (40, 50) may also communicate with an HVAC control system, such that temperatures sensed by sensors (40, 50) may also affect operation of a building's HVAC system in addition to or in lieu of affecting operation of fan (10). Motor controller (20) of this example includes a processor (22) that compares substantially contemporaneous temperature readings provided by the two sensors (40, 50). Motor controller (20) then adjusts the speed at which hub rotates (16), based on the comparison of the substantially contemporaneous temperature readings, as described in greater detail below. Of course, any suitable type of circuit or module may be used to control the speed of motor (14). Furthermore, processor (22) or other device that compares temperature readings and/or issues associated commands may be integral with or separate from a motor controller (20). Suitable rates for polling temperature sensors (40, 50) (e.g., once every two seconds) will be apparent to those of ordinary skill in the art in view of the teachings herein.

By placing one temperature sensor (40) nearer the ceiling (2) and a second sensor (50) nearer the floor (4), the difference between the two readings may represent the degree to which operation of fan (10) is required to establish a desired uniform temperature condition. For instance, the system may be programmed such that a larger difference between the two temperature readings results in a progressively faster speed of fan (10); and the speed of fan (10) may be controlled to progressively decrease as the difference between temperature readings decreases.

When the two temperature readings become approximately equal or within a predefined range of acceptable difference, fan (10) may react accordingly. For instance, when the two temperature readings become approximately equal or within a predefined range of acceptable difference, fan (10) may resume whatever speed it had before the difference between the two temperature readings exceeded a predefined threshold. Alternatively, fan (10) may stop (e.g., power to the motor (14) ceases, such that fan (10) may "coast" to a stop; decelerate to a stop in a controlled manner; or abrupt stop due to mechanical braking or motor braking; etc.) when the two temperature readings become approximately equal or within a predefined range of acceptable difference; with fan (10) starting to rotate again as soon as the system detects the temperature difference exceeding a predefined threshold. Fan (10) may also be constantly running, with the speed of fan (10) constantly changing or often changing, dynamically responding to sensed temperature differences as they are detected. Other ways in which a fan

(10) may be controlled based on two or more temperature readings (e.g., in response to the temperature differences exceeding a predefined threshold and/or in response to the sensed temperatures being approximately equal or within a predefined range of acceptable difference) will be apparent to those of ordinary skill in the art in view of the teachings herein. Suitable ranges of difference between an upper temperature and a lower temperature for causing a fan (10) to stop or otherwise react will also be apparent to those of ordinary skill in the art in view of the teachings herein.

After an upper temperature reading and lower temperature reading have become approximately equal or within a tolerable range (e.g., such that the room as sufficiently destratified), and fan (10) has stopped or otherwise reacted (e.g., merely slowed down, even if just slightly), the difference between an upper temperature reading and a lower temperature reading may still be monitored. For instance, temperature sensors (40, 50) may be polled every few seconds or at any desirable rate while fan (10) is stopped or while fan (10) is operating at a user-defined speed. When the difference between the upper temperature and lower temperature exceeds a threshold, processor (22) may send a signal to VFD (24) to again initiate rotation of fan (10). To the extent that a fan (10) is deactivated or otherwise stopped when the two temperature readings become approximately equal or within a predefined range of acceptable difference, a suitable temperature differential threshold for re-activating fan (10) will be apparent to those of ordinary skill in the art in view of the teachings herein, and may based on the particular location of fan (10) and/or other considerations. The temperature difference may again be monitored as noted above while fan (10) is operating, and fan (10) may be controlled accordingly.

As noted above, in some versions, fan (10) may be constantly rotating, with the speed being dynamically controlled (e.g., sped up, slowed down, etc.) based on differences between sensed temperatures. For instance, the control system may be configured such that no range of difference between the temperatures is acceptable, such that fan (10) is constantly reacting to even small differences in temperatures. To the extent that the difference between temperatures is relatively small or imperceptible, the speed of fan (10) may be substantially constant (e.g., a speed associated with a user's input at a control device, stopped, etc.).

In some versions, an upper temperature sensor (40) may be incorporated into the assembly of fan (10) itself. In addition or in the alternative, an upper temperature sensor (40) may comprise a separate unit installed near the ceiling (2). Upper temperature sensors (40) may also be installed on a wall or other structure. Other suitable locations for installing one or more upper temperature sensors (40) will be apparent to those of ordinary skill in the art in view of the teachings herein. Furthermore, any suitable number of upper temperature sensors (40) may be used. To the extent that more than one upper temperature sensor (40) is used, the readings from the plurality of upper temperature sensors (40) may be averaged together for comparison against a lower temperature level. Alternatively, data from a plurality of upper temperature sensors (40) may be used in a variety of alternative ways, in comparison to one or more temperature levels sensed by lower temperature sensor(s) (50) or otherwise.

In some versions, a lower temperature sensor (50) may be incorporated into a control panel associated with motor controller (20). In addition or in the alternative, a lower temperature sensor (50) may comprise a separate unit to be installed near the floor (4). Lower temperature sensors (50) may also be installed on a wall or other structure. Other suitable locations for installing one or more lower temperature sensors (50) will be apparent to those of ordinary skill in the art in view of the teachings herein. In addition, as noted above with respect to upper temperature sensors (40), any suitable number of lower temperature sensors (50) may be used. To the extent that more than one lower temperature sensor (50) is used, the readings from the plurality of lower temperature sensors (50) may be averaged together for comparison against an upper temperature level. Alternatively, data from a plurality of lower temperature sensors (50) may be used in a variety of alternative ways, in comparison to one or more temperature levels sensed by upper temperature sensor (40) or otherwise.

In some versions, a single pair of temperature sensors (40, 50) is used to control a single fan (10). In other versions, a single pair of temperature sensors (40, 50) is used to control a group of several fans (10). Other ways in which any number of temperature sensors (40, 50) and any number of fans (10) may be correlated will be apparent to those of ordinary skill in the art in view of the teachings herein. Of course, while two temperature sensors (40, 50) are included in the present example, it should be understood that any suitable number of temperature sensors may be used in any suitable locations.

Figure 2:
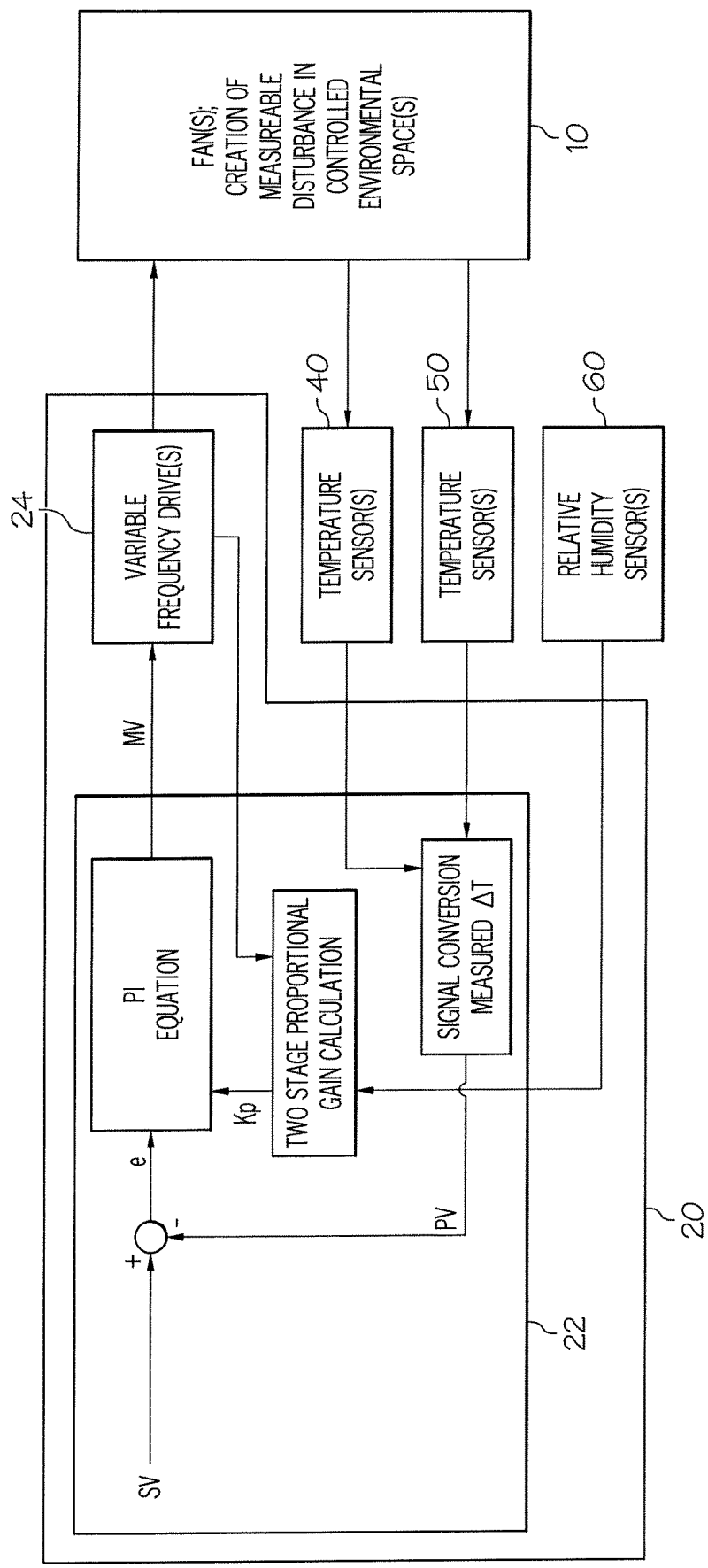
FIG. 2 depicts a schematic view of control components of the fan system of FIG. 1.

FIG. 2 shows a schematic view of an exemplary control configuration. As shown, motor controller (20) comprises a processor (22) a VPD (24). Processor (22) communicates with VPD (24), which in turn communicates with fan (10). Temperature sensors (40, 50) and a relative humidity sensor (60) communicate with processor (22). In the present example, processor (22) makes corrections to the speed of fan (10) via a PID controller (Proportional, Integral, Derivative). Alternatively, any other suitable type of controller may be used. In the present example, temperature differentials are constantly monitored by processor (22), resulting in a command speed to fan (10). In some versions, the set value (SV) (e.g., target temperature difference between upper sensor (40) and lower sensor (50» is always zero. This may represent a perfectly destratified space. Alternatively, any other suitable SY may be used. The sensed temperature difference (~T) is used as a process variable (PY), which is compared to the SY. The error between these two variables is then handled by processor (22) and PI loop logic, resulting in an adjusted fan command speed (MY, or manipulated variable).

To the extent that humidity sensor (60) is included, humidity sensor (60) may be placed at any suitable location. Furthermore, humidity data obtained by humidity sensor (60) may be factored into a control algorithm in any suitable fashion, such as is described below or otherwise. Suitable ways in which humidity data may be used to influence control of fan (10), such as in conjunction with data from temperature sensors (40, 50), will be apparent to those of ordinary skill in the art in view of the teachings herein.

It should be understood that behavior of fan (10) may be varied based on a variety of factors, in addition to or in lieu of ~T. For instance, the behavior of fan (10) may be varied based on relative humidity (RH), the difference between an indoor temperature and indoor temperature, and/or the status of an HY AC system (e.g., whether an HYAC system is in a heating mode or cooling mode, etc.), among other possible factors or parameters. Furthermore, behavior of fan (10) might be different based on whether the temperature is cooler outdoors than it is indoors, or warmer outdoors than it is indoors (e.g., seasonal modes). Yet another variable that may control system response may include absolute room temperature (e.g., warm or cool, etc). Still other constants, variables, or parameters that may be used to influence behavior of fan (10) will be apparent to those of ordinary skill in the art in view of the teachings herein.

In the present example, the speed of system response to error is controlled by proportional gain (Kp). In some versions, Kp is a number that may be derived from the following two places: relative humidity and VFD (24) acceleration/deceleration rates. Alternatively, Kp may be derived from only one of those factors, derived from any other factor(s), or derived from any suitable combination of factors. In the present example, Kp(RH) defines the level of aggression by which the fan (10) will respond to error, such as will be described in greater detail below or otherwise.

A system may also provide a "Summer mode," "Winter mode" and/or a variety of other modes. Such modes may be selected manually or automatically (e.g., based on an electronic timer or calendar, based on outdoor temperatures, temperature trends, other environmental conditions, etc.). By way of example only, in a Summer mode, higher values of RH may result in a higher Kp. In a Winter mode, higher values of RH may result in a lower Kp. Further exemplary details of Winter modes and Summer modes will be described in greater detail below. Of course, any other suitable modes may be used, and may have any suitable effect on Kp. Furthermore, any other suitable control configuration, components, parameters, and functions may be used.

The following TABLE 1 shows various exemplary ranges of parameters under which various versions of fan (10) may be operated. It will be appreciated, however, that the numerical values and ranges shown in the table are merely exemplary and are merely approximate. They are not intended to be exhaustive, definitive, or limiting in any way. Instead, they merely represent several of numerous possible ways in which a fan system may be operated.

Furthermore, "Range Low" may be omitted altogether, if desired (e.g., when there is no Winter/Summer mode distinction).

Also in TABLE 1, "Range High" describes the temperature point at which fan (10) may operate at 100% output (e.g., 60 Hz). The temperature span between "Range Low" and "Range High" may be scaled to equal a fan output between a VFD Frequency set point and full speed (e.g., 60 Hz). Again, motor controller (20) may permit an installer or user to adjust the "Range High" range; and "Range High" may be omitted if desired.

Also in TABLE 1, "VFD Frequency" describes the maximum speed of fan (10) in Winter mode, and the minimum speed of fan (10) in Summer mode. For instance, in Winter mode, fan (10) may be limited to speeds between 10 Hz and 25 Hz to 45 Hz. In Summer mode, fan (10) may be limited to speeds between 25 Hz to 45 Hz and 60 Hz. Again, motor controller (20) may permit an installer to adjust the "VFD Frequency" range.

In some versions, and as referred to above, motor controller (20) may provide three different modes—Winter mode, Summer mode, and Manual mode. In an example of Winter mode, the system may act as an automatic destratification controller. Floor temperature, as sensed by lower temperature sensor (50), may be subtracted from ceiling temperature, as sensed by upper temperature sensor (40), to define t. T of the space. This value may then be scaled against a user defined low speed range to determine an optimum rate of rotation for fan (10). The user may define this range by adjusting the "VFD Frequency" parametric setting. For instance, if the setting is 30 Hz, then the Winter speed range may be between 10 Hz and 30 Hz. The system may constantly fine tune the rotational speed of fan (10) in order to achieve a t. T that is equal to or at least close to zero, which should reflect a substantially destratified space. In an effort to address "wind chill" effects, the system may moni-

TABLE 1

|  | "Real World" Values | Processor "Interpreted" Values |
|---|---|---|
| Processor Analog Output Span | 0.0~10.0 VDC | 2~1018 10 Bit Resolution |
| Processor Analog Input Span | 0.0~10.0 VDC | 2~1018 10 Bit Resolution |
| Temperature Sensor Outputs | 5°~140° Fahrenheit | 103~513 10 Bit Resolution |
|  | 1.0~5.0 VDC | 3.037 Bits/° F. |
| Humidity Sensor Outputs | 5%~95% RH | 123~493 10 Bit Resolution |
|  | 1.2~4.8 VDC | 4.11 Bits/% RH |
| Range Low | 50°~75° Fahrenheit | 240~316 10 Bit Resolution |
| Range High | 85°~105° Fahrenheit | 346~407 10 Bit Resolution |
| VFD Frequency | 25~45 Hz | 307~713 10 Bit Resolution |
|  | 3.0~7.0 VDC Analog Out | 20.32 Bits/Hz |

In the above TABLE 1, "Range Low" describes a break point between Winter and Summer automatic modes. For instance, when the temperature sensed by lower sensor (50) is below the 50° F. to 75° F. range, motor controller (20) will be automatically placed in Winter mode. In Winter mode, motor controller (20) may be configured to automatically perform destratification routines as described herein (e.g., control motor (14) based on differences between temperatures sensed by temperature sensors (40, 50) in order to reduce or eliminate such differences). When the temperature sensed by lower sensor (50) is within or above the 50° F. to 75° F. range, motor controller (20) will be automatically placed in Summer mode. Of course, motor controller (20) may permit an installer or user to adjust the "Range Low" range.

tor relative humidity in the space, such as with relative humidity sensor (60). When humidity is higher than 60% (or any other suitable threshold), the system may scale back the response time of the speed change of fan (10) based on internal algorithms. Longer response times may allow the room to destratify without creating air velocities that could potentially become comfortable in colder temperatures.

In an example of Summer mode, the system may run fan (10) at a speed relative to the temperature span between "Range Low" and "Range High," as defined by the user. This predefined temperature range may be scaled against a user defined high speed range to determine an optimum rotational rate for fan (10). The user may define the speed range by adjusting the "VFD Frequency" setting. For instance, if the VFD Frequency setting is 35 Hz, then the summer speed range may be between 35 Hz and 60 Hz. Of course, any other suitable ranges may be used.

In an example of Manual mode, the system runs fan (10) at a speed as defined by the user through any suitable user input device. Such a speed may be unaffected by temperatures sensed by temperature sensors (40, 50). Of course, the above described Winter, Summer, and Manual modes are merely exemplary. Such modes may be modified or omitted as desired, and any other suitable mode(s) may be provided.

In some versions, other properties of fan (10) may be controlled based on temperature differentials or other factors, in addition or in lieu of controlling the rate of rotation of fan. By way of example only, the angle of attack at which blades (18) are mounted to hub (16) or blade pitch may be adjusted to affect fan performance, based on temperature differentials or other factors. The angle of attack or blade pitch may be adjusted using servos, louver actuators, hydraulics, pneumatics, or any other suitable components, devices, mechanisms, or techniques. Still other ways in which temperature differentials and/or other environmental conditions may be used to affect performance of a fan (10), including but not limited to physical properties of fan (10) and/or operation of fan (10), will be apparent to those of ordinary skill in the art in view of the teachings herein.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A fan system installed in a location having a floor and a ceiling, the fan system comprising:
    a fan comprising a rotatable hub, a plurality of fan blades secured to the hub, and a motor in communication with the hub;
    a motor controller in communication with the motor;
    an upper sensor in communication with the motor controller, wherein the upper sensor is configured to sense a temperature of air near the ceiling;
    a lower sensor in communication with the motor controller, wherein the lower sensor is configured to sense a temperature of air near the floor; and
    a humidity sensor, wherein the humidity sensor is configured to sense relative humidity, wherein the humidity sensor is in communication with the motor controller;
    wherein the motor controller is configured to automatically adjust a rate of rotation at which the motor drives the hub by comparing the sensed temperature of air near the ceiling or the sensed temperature of air near the floor with a user-selected temperature range.

2. The fan system of claim 1, wherein the motor controller is configured to compare the sensed temperature of air near the ceiling to the sensed temperature of air near the floor.

3. The fan system of claim 2, wherein the motor controller is configured to continuously adjust the rate of rotation at which the motor drives the hub to minimize a difference between the sensed temperature of air near the ceiling and the sensed temperature of air near the floor.

4. The fan system of claim 1, wherein the motor controller further comprises a processor.

5. The fan system of claim 4, wherein the upper sensor and the lower sensor are coupled with the processor, wherein the processor is coupled with a variable frequency drive coupled with the motor.

6. The fan system of claim 1, wherein the user-inputted temperature range comprises a low temperature range.

7. The fan system of claim 1, wherein the user-inputted temperature range comprises a high temperature range.

8. The fan system of claim 1, wherein, when the sensed temperature of air near the floor is below the user-selected temperature range, the motor controller implements a first mode of operation configured to control the motor to drive the hub at a determined rate of rotation that reduces the difference between the sensed temperature of air near the ceiling and the sensed temperature of air near the floor.

9. The fan system of claim 8, wherein the first mode of operation is associated with a first fan speed range.

10. The fan system of claim 9, wherein the motor controller implements a second mode of operation configured to control the motor to drive the hub at a second fan speed greater than the first fan speed range when the sensed temperature of air near the floor is within the user-selected temperature range.

11. The fan system of claim 8, wherein the motor controller implements a second mode of operation configured to control the motor to drive the hub at a second fan speed greater than the first fan speed range when the temperature sensed by the lower sensor is above the user-selected temperature range.

12. The fan system of claim 1, wherein the motor controller is configured to control the motor to drive the hub at a maximum fan speed when the sensed temperature of air near the floor is within the user-selected temperature range.

13. The fan system of claim 1, wherein the motor controller is configured to determine a difference between the sensed temperature of air near the ceiling from the sensed temperature of air near the floor, wherein the difference is scaled against a user-selected speed range to determine the rate of rotation for the fan.

14. The fan system of claim 1, wherein the motor controller is configured to automatically adjust the rate of rotation at which the motor drives the hub based further at least in part on a humidity level communicated from the humidity sensor.

15. The fan system of claim 1, wherein the motor controller is configured to adjust a response time for changing the rate of rotation based on the sensed relative humidity.

16. The fan system of claim 1, further including a plurality of fans controlled based on the sensed temperature of air near the ceiling and the sensed temperature of air near the floor.

17. A fan system installed in a location having a floor and a ceiling, the fan system comprising:
    a ceiling fan comprising a rotatable hub, a plurality of fan blades secured to the hub, and a motor for driving the rotatable hub;
    a motor controller for controlling the motor;
    a first sensor configured to sense a temperature of air near the ceiling; and
    a second sensor configured to sense a temperature of air near the floor;
    wherein the motor controller is configured to automatically adjust a mode of operation of the fan by comparing the sensed temperature of air near the ceiling or the sensed temperature of air near the floor with a user-selected temperature range, wherein in a first mode of operation of the fan, the controller automatically adjusts a first response time for changing a rate of rotation at which the motor drives the hub in response to an environmental parameter, wherein in a second mode of operation of the fan the controller automatically adjusts a second response time for changing the rate of rotation at which the motor drives the hub in response to the environmental parameter, and wherein the first response time is different from the second response time.

18. A fan system installed in a location having a floor and a ceiling, the fan system comprising:

a fan comprising a rotatable hub, a plurality of fan blades secured to the hub, and a motor in communication with the hub;

a motor controller in communication with the motor;

an upper sensor in communication with the motor controller, wherein the upper sensor is configured to sense a temperature of air near the ceiling;

a lower sensor in communication with the motor controller, wherein the lower sensor is configured to sense a temperature of air near the floor; and a sensor for sensing a relative humidity;

wherein the motor controller is configured to automatically adjust a rate of rotation at which the motor drives the hub by comparing the sensed temperature of air near the ceiling or the sensed temperature of air near the floor with a user-selected temperature range; and wherein the motor controller is configured to adjust a response time for changing the rate of rotation based on the sensed relative humidity.

* * * * *